(12) United States Patent
Stäb et al.

(10) Patent No.: US 6,258,239 B1
(45) Date of Patent: Jul. 10, 2001

(54) PROCESS FOR THE MANUFACTURE OF AN ELECTRODE FOR A SOLID POLYMER FUEL CELL

(75) Inventors: Gabriele D. Stäb, Sindelfingen; Peter Urban, Ulm, both of (DE)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/211,336

(22) Filed: Dec. 14, 1998

(51) Int. Cl.$^7$ ........................................ C25D 5/18
(52) U.S. Cl. .................. 205/104; 205/105; 205/102; 205/103; 205/257; 205/82; 205/83; 205/84
(58) Field of Search ................... 205/109, 102, 205/105, 107, 108, 163, 157, 165, 104, 83, 159, 255, 257, 82, 84; 204/229.4, 230.2

(56) References Cited

U.S. PATENT DOCUMENTS

| | | | | |
|---|---|---|---|---|
| 3,767,538 | * | 10/1973 | Politycki | 204/30 |
| 3,847,659 | * | 11/1974 | Sobajima | 117/211 |
| 4,789,437 | * | 12/1988 | Sing | 204/12 |
| 4,876,115 | * | 10/1989 | Raistrick | 427/115 |
| 5,084,144 | * | 1/1992 | Reddy | 205/104 |
| 5,486,998 | * | 1/1996 | Corso | 364/152 |
| 5,527,445 | * | 6/1996 | Palumbo | 205/103 |
| 5,635,039 | * | 6/1997 | Cisar | 204/252 |
| 5,660,706 | * | 8/1997 | Zhao | 205/123 |
| 5,869,201 | * | 2/1999 | Marchetti | 429/30 |
| 5,972,192 | * | 10/1999 | Dubin | 205/101 |

FOREIGN PATENT DOCUMENTS

0036532 * 3/1977 (JP).
S61-110795 * 5/1986 (JP).

OTHER PUBLICATIONS

Bokis & Reddy ISBN 0–306–25002–0, 1970.*

* cited by examiner

Primary Examiner—Kathryn Gorgos
Assistant Examiner—J. Maisano
(74) Attorney, Agent, or Firm—McAndrews, Held & Malloy, Ltd.

(57) ABSTRACT

In a process for manufacturing an electrode for a PEM fuel cell or an electrochemical energy converter, an ion-exchange polymer is applied to one face of an electrode substrate. An electrocatalyst is then applied to the substrate by electro-chemical deposition, preferably from a solution containing one or more complexes or salts of the electrocatalyst. The electrochemical deposition occurs by application of a voltage between a pair of electrodes, one of which is the electrode under preparation. The voltage between the two electrodes is controlled by controlling the potential of the working electrode. A pulsed voltage profile is applied across the two electrodes during the electrodeposition process.

23 Claims, 5 Drawing Sheets

PROCESS FOR THE MANUFACTURE OF AN ELECTRODE FOR A SOLID POLYMER FUEL CELL

FIELD OF THE INVENTION

The present invention relates to electrode manufacture. In particular, the invention relates to an electrodeposition process used in the manufacture of electrodes for solid polymer fuel cells, or other electrochemical energy converters.

BACKGROUND OF THE INVENTION

Electrochemical fuel cells convert fuel and oxidant to electricity and reaction product. Solid polymer electrochemical fuel cells generally employ a membrane electrode assembly ("MEA") consisting of a solid polymer electrolyte or ion exchange membrane disposed between two electrode layers. The electrode layers typically comprise porous, electrically conductive sheet material as a substrate, and an electrocatalyst disposed at each membrane/electrode layer interface to induce the desired electrochemical reaction.

The electrocatalyst may be applied to the electrode substrate, or to the membrane electrolyte, using a variety of well-documented techniques. Typical fuel cell electrocatalysts are expensive. It is therefore important to use the electrocatalyst material as efficiently as possible. This includes increasing utilization of the electrocatalyst in the fuel cell electrodes.

In fuel cell operation, effective electrocatalyst sites are accessible to the reactant in the fuel cell, are electrically connected to the fuel cell current collectors, and are ionically connected to the fuel cell electrolyte. Electrocatalyst sites which are ionically isolated from the electrolyte are not productively utilized if ions generated by the fuel cell reactions at the electrocatalyst sites do not have a means for being ionically transported to the electrolyte.

A measure of electrochemical fuel cell performance is the voltage output from the cell for a given current density. Higher performance is associated with a higher voltage output for a given current density or higher current density for a given voltage output. Increasing effective utilization of the electrocatalyst enables the same amount of electrocatalyst to induce a higher rate of electrochemical conversion in a fuel cell resulting in improved performance.

U.S. Pat. No. 5,084,144 discloses an electrodeposition method for the preparation of fuel cell gas diffusion electrodes. A layer of proton-conducting polymer is impregnated into one surface of a carbon-containing electrode substrate. Electrocatalyst is then deposited on the surface of substrate using a DC or pulse current electrodeposition technique. Thus, together with a counterelectrode, the gas diffusion electrode is immersed in a bath containing primarily cations ($M^+$, $M^{++}$, $M^{+++}$) of the metals of groups VIII or Ib of the periodic table, and a direct current is applied. The current may be constant or several current pulses with a relatively long pulse duration (duration of approximately 6–120 seconds) may be used. As a result, a thin layer of electrocatalyst is deposited only where it is ionically connected to the proton-conducting polymer coating, which in turn will be in contact with the electrolyte in the MEA.

Other electrodeposition processes have been used in the preparation of fuel cell electrodes. For example, in U.S. Pat. No. 5,599,638 and PCT/International Publication No. WO96/12317 (Application No. PCT/US94/11911), a controlled potential is used for the electrodeposition step. A constant voltage is applied for 5–10 minutes continuously, without current or voltage pulsing. This potentiostatic control permits some control of the electrochemical processes which occur, but the growth of the electrocatalyst clusters is difficult to control using the described technique. The substrate is not impregnated with any ion-conducting polymer prior to electrodeposition. Instead, the electrode is impregnated, preferably with a Nafion® or another proton-conductive polymer solution after electrodeposition of the electrocatalyst. Another article (Journal of Power Sources, 1998, 75, 230–235) discloses use of DC or pulsed current electrodeposition of electrocatalyst, again without pre-impregnation of the substrate with an ion-conducting polymer.

In certain of the electrodeposition processes described above, the electrode potentials are uncontrolled, and tend to vary at the surface of the electrodes according to the applied current and over time. Depending on the potential, different electrochemical processes and reactions will occur, as they are dependent on the overpotential. For example, some processes will not occur until the overpotential reaches a particular level. Where the potentials are controlled, a voltage is conventionally applied continuously resulting in relatively uncontrolled growth of electrocatalyst clusters during the electrodeposition process.

By controlling the potential and applying a pulsed voltage profile (varying voltage with time) between the electrodes (which is suited to the particular substrate and electrolyte) it is possible to selectively control the processes which will occur during the electrodeposition of an electrocatalyst, and to control the physical deposition of the electrocatalyst.

SUMMARY OF THE INVENTION

In a process for the manufacture of an electrode for a PEM fuel cell or an electrochemical energy converter, an ion-exchange polymer is applied to one face of an electrode substrate. This may be accomplished, for example, by impregnation or coating with a solution of an ion-exchange polymer, or preferably by laminating or bonding the substrate to a pre-formed membrane layer or film. An electrocatalyst is then applied to the substrate by electrochemical deposition, preferably from a solution containing one or more complexes or salts of the electrocatalyst, or alternatively from a melt containing one or more complexes, salts or metals. The electrochemical deposition occurs by application of a voltage between a pair of electrodes (a working electrode which is the electrode under preparation, and a counterelectrode). The voltage between the two electrodes is controlled by controlling the potential of the working electrode. A pulsed voltage profile is applied between the two electrodes during the electrodeposition process. The preferred potentials and voltage profiles are dependent on the nature of the substrate and the solution in which it is immersed.

The electrode substrate material is a porous electrically conductive sheet material, which is typically carbonaceous. Preferably it is flexible, and suitable for processing in a reel-to-reel type process. For example, it may be a paper, a fabric-like tissue, a woven or non-woven material, a felt or cloth or a composite material containing a particulate carbon-filler. Generally the thickness is in the range of about 50–300 $\mu$m.

Using the described method, electrodes which have an extremely low electrocatalyst loading (as low as a few $\mu g/cm^2$), but which exhibit substantially the same performance as conventional electrodes (with higher loadings), have been prepared. This allows for a substantial reduction in the cost of the electrodes. A further contribution to cost reduction and simplification of the electrode manufacturing method is that the electrocatalyst does not need to be synthesized before being incorporated into the fuel cell electrode.

Through the use of a flexible carbonaceous substrate and a flexible polymer membrane, a durable, single-electrode/membrane assembly may be prepared in a continuous manufacturing process, which is suitable for large-scale production.

Particularly advantageous is the use of $H_2PtCl_6$ as an electrocatalyst precursor. The electrocatalyst is preferably electrodeposited from a solution of this platinum complex, which is readily available at reasonable prices.

DETAILED DESCRIPTION OF PREFERRED EMBODIMENTS

Figure 1:
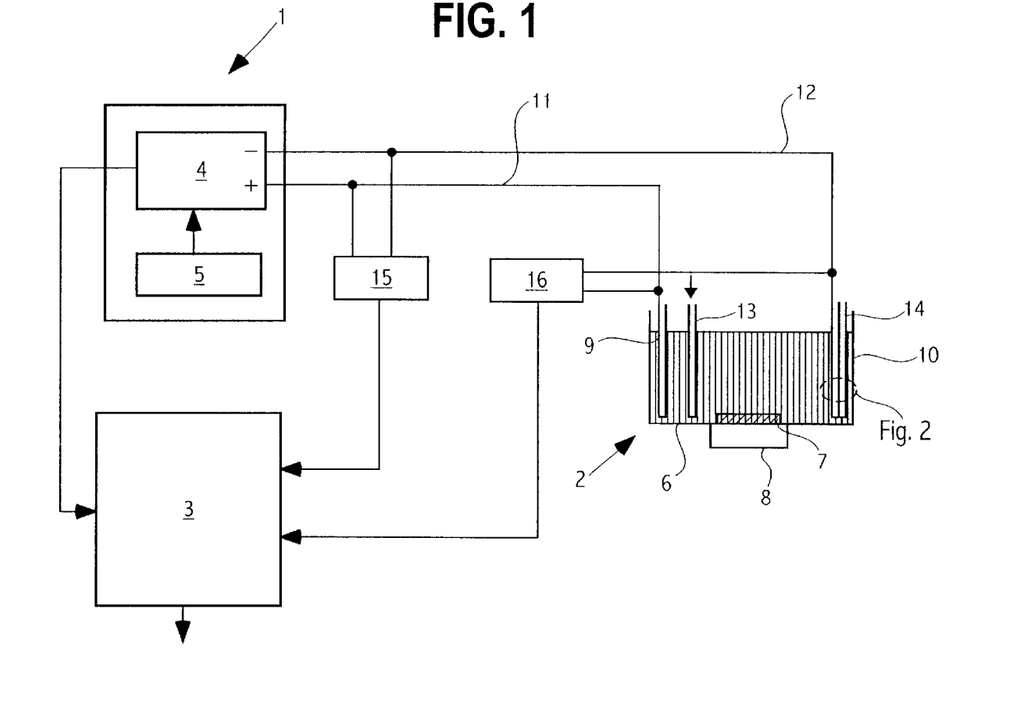
FIG. 1 is a schematic diagram of an apparatus suitable for the manufacture of an electrode using the present voltage-controlled electrodeposition technique.

A laboratory apparatus suitable for the manufacture of electrodes for solid polymer fuel cells is illustrated schematically in FIG. 1. The apparatus comprises a voltage source designated generally as 1, deposition equipment designated generally as 2, and an evaluation device 3. The voltage source 1 includes a power supply 4 and a so-called function generator 5, which allows for the generation of different voltage pulses and profiles, with a pulse train typically between 0 to 100 kHz. Examples of such profiles are sinusoidal, triangular, rectangular or saw-tooth curves, at any pre-set but variable voltage values (taking into consideration potential side reactions and maintaining acceptable current efficiency). Besides the profiles mentioned, however, function generator 5 may generate practically any pulse curve. Such voltage sources 1 with a function generator 5 are known in the art and will, therefore, not be described in more detail here.

Deposition apparatus 2 includes container or bath 6 containing one or more complex salts of one or more electrocatalyst metals, dissolved in an electrolyte. This allows for the deposition of alloys of various alloy compositions (within physical-chemical limits). The solution is preferably mixed, for example, with the help of a magnetic stir bar 7 driven by a magnetic stirrer 8. The stirring may be forgone if the solution is agitated sufficiently by gas directed into it through one or more nozzles. It is also possible to stir the solution in bath 6 by moving electrodes 9 and 10.

Two electrodes 9 and 10 are immersed in the solution. Electrodes 9 and 10 are connected to voltage source 1 by electrical paths 11 and 12. In addition, pipe and nozzle 13 extends to the lower portion of bath 6, and is provided for directing an inert gas into the solution. The inert gas, preferably argon or nitrogen, serves to remove the oxygen from the solution (which limits potential side reactions) and may permit more exact determinations about the current efficiency to be made. For series production, it may be possible to forgo the use of an inert gas.

Figure 2:
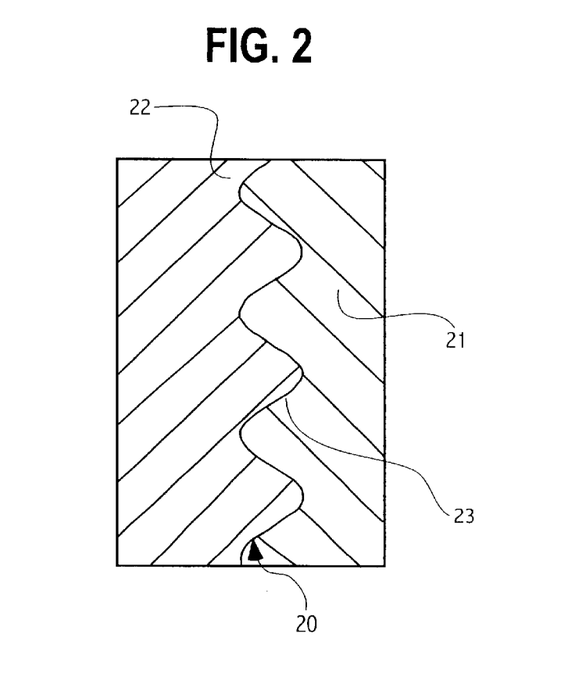
FIG. 2 is a schematic diagram of a portion of an electrode of FIG. 1.

Electrocatalyst is electrochemically deposited from the solution onto one of electrodes 9 and 10, (the working electrode, i.e. cathode 10 in the embodiment illustrated in FIG. 1). The other electrode, (i.e. anode 9 in the embodiment illustrated in FIG. 1), is the counterelectrode. The manufacture and exact design of cathode 10 is described in more detail below. FIG. 2 shows schematically a portion of fuel cell electrode 10 (for example, the area designated as "A" in FIG. 1, but without cover 14). At the interface between the membrane 22 and carbonaceous substrate 21 are electrodeposited electrocatalyst particles 23. Preferably an electrically non-conductive cover 14 is provided on surface of cathode 10 facing away from anode 9, so that electrocatalyst is deposited only on the surface of cathode 10 facing anode 9. With regard to possible series production, cover 14 may be disposed against or attached to cathode 10 in a flexible manner. In some cases it may be forgone. Such a cover was used for easier handling during the manufacture of prototype electrodes.

Furthermore, the laboratory equipment of FIG. 1 includes two control units 15 and 16. Control units 15 and 16 may be, for example, oscilloscopes, where the control unit 15 is connected across electrical paths 11, 12 close to voltage source 1 and control unit 16 is connected across the paths 11, 12 closer to deposition apparatus 2. In the illustrated configuration, control unit 15 is used for monitoring the set values for the voltage, while control unit 16 is used for monitoring the actual values. Evaluation device 3 is used for data recording and data output as well as the transfer of data for data evaluation. In evaluation device 3, the current data is recorded when the voltage is preset. The amount of electricity that flowed during the deposition process is integrated by the connected evaluation device 3 and may be read directly. Simultaneously, the data collected by control units 15, 16 is transferred to evaluation device 3.

Electrolyte:

A preferred electrolyte to be used for dissolving the electrocatalyst precursor material, for example in the form of metal salts, is 0.1–5 molar aqueous $H_2SO_4$, HCl, $HClO_4$, or $H_3PO_4$. However, suitable electrolytes may also include alcoholic, ketonic, carboxylic-acid-containing or halo-acid-containing solutions as well as alkanes, alkenes, or alkynes and their derivatives. Furthermore, solutions of oxo-acids of sulphur, nitrogen, phosphorus, and their halogen derivatives, oxo-acids of halogens, hydrogen compounds of nitrogen (for example ammonia or hydrazine) or their halogen derivatives, sulfonic acids of nitrogen hydrogen compounds (for example, amidosulfonic acid), boric acid, rhodanide, cyanide or urea-containing solutions or $H_2O_2$. Another possibility is the electrodeposition of electrocatalysts from a melt.

Complexes for Deposition:

For the electrochemical deposition of electrocatalysts onto electrode substrates, solutions of the following metal salt complexes, (for example, in the above-mentioned electrolytes) may be preferably considered:

Pt: $H_2PtCl_6$, $K_2PtCl_6$, $(NH_4)_2PtCl_6$, $[Pt(NH_3)_2(NO_2)_2]$, $H_2Pt(OH)_6$, $Na_2Pt(OH)_6$, $[H_2Pt(NO_2)_2SO_4]$, $K_2Pt(OH)_6$, $PtCl_4 \cdot 5 H_2O$, alkali platinum phosphate baths, alkali platinum salts of organic acids (for example alkali citrate and oxalate), $[(NH_3)_2Pt(SCN)_2]$, $[PtCl_4 (NH_3)_2]$, $[(NH_3)_4Pt (NO_3)_2]$, $[(CH_3)_3 (CH_3C_5H_4) Pt]$, $[Pt(NH_3)_4]Cl_2$, $K_2Pt(CN)_6$, $K_2Pt(NO_2)_4$, Pt-sulphamate, $(NH_4)_2PtCl_4$, $(NH_3)_2PtCl_2$, $(C_5H_7O_2)_2Pt$, $PtCl_2$, $PtCl_4$, $PtCl_4^{2-}$;

Ru: $RuCl_3$, $RuNO(NO_3)_2$, $RuCl_3 \cdot 3 H_2O$, $(K_2[Ru_2O (H_2PO_4)_7 \cdot 8H_2O])$ in $H_3PO_4$, $Ru(NO)Cl_3 \cdot 5 H_2O$, Ru-sulphamate (acid: $NH_2SO_3H$), $Na_2$ [Ru(NO)$(NO_2)_4OH$], Ru-nitrosyl sulphamate solution, Ru-nitrosyl sulphate (Ru(III) and Ru(IV)), $K_2[Ru(OH)(NO_2)_4(NO)]$, Ru-sulphate, $(NH_4)_2Ru(NO)Cl_5$, Ru-sulphamate, Na [$Ru(NO_2)_4(NO)$], $K_2Ru(NO)Cl_5$, $K_2RuCl_5$, $Ru(OH)Cl_3$;

Co: $CoSO_4 \cdot xH_2O$, $Co(NH_4)_2(SO_4)_2 \cdot xH_2O$, $CoCl_2$, [Co$(H_2O)_6]Cl_2$, $Co(NO_3)_2 \cdot xH_2O$, $Co(NH_3)_6^{2+}$, $Co(NH_3)_6^{3+}$;

Cu: $CuSO_4$, ($KNaC_4H_4O_6 \cdot xH_2O$), $Cu(BF_4)_2$, $Cu(HCOO)_2 \cdot xH_2O$, pyrophosphate-, $Cu(NH_4)_2(SO_4)_2$, $[Cu(NH_3)_4]^{2+}$, fluorosilicate-Cu, alkyl sulphonate-Cu, oxalate-Cu;

Cr: $CrCl_3 \cdot xH_2O$, $Cr(OH)_3$, $CrO_3$, $CrO_4^{2-}$, $Cr_2(SO_4)_3$, $KCr(SO_4)_2 \cdot 12\ H_2O$, $Na_2Cr_2O_7 \cdot 2\ H_2O$;

Ni: $NiSO_4 \cdot xH_2O$, $NiCl_2 \cdot 6\ H_2O$, $Ni(NH_2SO_3)_2$, $Ni(NH_4)_2(SO_4)_2$, $Ni(HCOO)_2 \cdot 2H_2O$;

Pd: $Pd(NH_3)_4(NO_3)_2$, $Pd(NH_3)_4(SO_4)_2$, Pd-chlorine palladites, $K_2PdCl_6$, $K_2Pd[NO_2]_4$, $Pd(NH_3)_2(NO_2)_2$, $Pd(NH_3)_2Cl_2$, $PdCl_2$, $PdSO_4 \cdot xH_2O$, $(NH_4)_2PdCl_4$, $(NH_3)_2PdCl_2$, $PdBr_2$, $K_2PdCl_4$, $Na_2PdCl_4$, $(NH_3)_4PdCl_2$, $(P(C_6H_5)_3)_4Pd$, $(CH_3CO_2)_2Pd$, $(C_5H_7O_2)_2Pd$, $[Pd(NH_3)_4](HCO_3)_2$;

Os: $(NH_4)_2OsCl_6$, $H_2OsCl_6(H_2O)_6$, $OsCl_3$;

Rh: $Rh(SO_4)^{3-}$, $K_2RhCl_5 \cdot xH_2O$, $Rh(H_2O)_6^{3+}$, $Rh(OH)^{2+}$, $Rh(OH)^{2+}$, $Rh^{3+}$ or $Rh^{4+}$ in sulphate or phosphate concentrate, $(NH_4)_3Rh(NO_2)_6$, $Na_3RhCl_6$ solution, $K_3[Rh(NO_2)_6]$, $Rh(NO_3)_3(H_2O)_2$, $RhCl_3 \cdot 5\ H_2O$, $Rh(CO)_2(C_5H_7O_2)$, $(C_5H_7O_2)_3Rh$;

Ir: $H_3IrCl_6$, $(NH_4)_3IrCl_6 \cdot H_2O$, $(NH_4)_3IrCl_6$, $K_3IrCl_6$, $K_2IrCl_6$, $K_3[Ir(NO_2)_6]$, $IrCl_3$, $IrCl_3 \cdot 3\ H_2O$, $H_2IrCl_6 \cdot xH_2O$;

Sn: $Na_2[Sn(OH)_6]$, $SnSO_4$, $SnCl_2$, $SnCl_4$, $SnI_4$, Sn-acetate, Sn-nitrate, $Sn(NH_2SO_3)_2$, Sn-fluosilicate, Sn-oxalate, Sn-diphosphate solution;

Au: $AuCl_3$, $H(AuCl_4)$, Au-sulphide, $KAuCl_4$, Au-chloride+$Na_2SO_3$, Au-thiosulphate solution, Au powder in thiourea solution;

Ag: $Ag(S_2O_3)_2]^{3-}$, $[Ag(NH_3)_2]^+$, AgI, $AgNO_3$, $Ag_2SO_4$, AgCl, silver acetate;

Re: $K_2ReCl_6$, $KReO_4$;

Pb: $[Pb(So_3NH_2)_2]$, PbO, $Pb(NO_3)_2$, Pb-fluoroborates, $Pb(NH_2SO_3)_4$, lead perchlorate, lead acetate, Pb-sulphonate, Pb-dithionate, Pb-pyrophosphate;

W: $(NH_4)_6H_2W_{12}O_{40}$, $WO_3 \cdot 2H_2O$, $WO_2 \cdot H_2O$, $H_2WO_4$, $WO_3$ from solution, W in $H_2O_2$ results in $[(O_2)_2(O)WOW(O)(O_2)_2]^{2-}$, $K_2WO_4$;

Zn: $[Zn(OH)_2]^{2-}$, $ZnSO_4 \cdot xH_2O$, $ZnCl_2$, ZnO, $Zn_2P_2O_7 \cdot 3H_2O$;

Solutions consisting of two or more metal salts or complexes may be used. With this kind of deposition, it is possible to deposit different metal or noble metal or noble metal/metal electrocatalyst compositions.

The above list merely gives an indication of the types or metal salts and complexes which may be used, but should not be construed as in any way limiting. Other electrolytes or catalyst complex salts may be used. The electrochemical deposition is performed, depending on the solution used, preferably in a temperature range of 20°–250° C., and preferably with a metal content of 2 mg/l to 150 g/l in the electrolyte solution. In the case of a melt, electrodeposition is performed at or above the melting temperature of the respective metal complexes or salts.

Deposition Method:

Electrochemical deposition of the electrocatalyst is performed at a controlled potential, which may be varied or pulsed with different waveforms and frequencies. The nature of the processes which occur and the type of crystallization or deposition is a function of the potential used and way in which it is pulsed or varied. Thus, electrocatalysts with the desired composition and crystalline structure may be deposited by carefully controlling and pulsing the potential.

The pulse frequency is preferably in the range between 0 Hz and 100 kHz. Possible pulse curves are, for example, sinusoid, triangular, rectangular, saw-toothed or any profile or combinable pulse sequences with any desired pulse magnitude, depending on the substrate and solution.

In principle, in the laboratory setup shown in FIG. 1 the preset voltage values may be constantly controlled by a connected oscilloscope 15 and compared with the actual values captured by a second oscilloscope 16 connected directly in the area of electrodes 9 and 10. Thus, it is possible to detect potential changes immediately. Simultaneous recording of the current density in the case of preset voltage and of the potential in the case of preset current density contributes to the controllability and reproducibility of the process.

Design of the Electrode:

A preferably flexible, somewhat hydrophobic, porous, carbonaceous substrate with a thickness preferably in the range from 50 $\mu$m to 300 $\mu$m is used. The porosity is preferably 40% to 90%. The substrate material is preferably catalyst-free, prior to the electrodeposition process. A flexible, ion-conductive membrane, preferably with a total thickness in the range of 5 $\mu$m to 130 m, is preferably used as a further starting material. The ion-conductive membrane preferably consists of a polymer with an equivalent weight <1000. Alternatively, the ion-conductive film may also be generated on the electrode substrate surface with a preset thickness by screen printing, spraying, tape casting, brushing, dipping, vapour deposition, plasma deposition or any another suitable deposition or coating method.

Manufacturing Process

When a membrane is used, it is bonded or laminated to the substrate to form a substrate-membrane assembly, hereinafter called an electrodeposition electrode 10. The ion-conductive membrane is preferably applied to the substrate by, for example, pressing, hot pressing, gluing, rolling, or hot laminating. During this process, an indistinct transition region, whose thickness varies with the processing method, is generally created between the substrate and membrane material. In some cases, no transition region can be recognized. A schematic diagram of such a transition region is illustrated in FIG. 2, where the interface 20 between the substrate 21 and membrane 22 is in reality indistinct and irregular or, in individual cases, not recognizable.

As mentioned above, a polymer film may be deposited on a surface of the substrate generated on the electrode's surface by vapour deposition or by plasma deposition, or some other suitable method.

When bonding or gluing a membrane to a substrate, a polymer solution is preferably applied to one or both sides of the surfaces to be bonded. Afterwards, the two surfaces can simply be joined, preferably at ambient temperature and with only a little pressure. The adhesive may be, for example, a 5% Nafion® solution (in, for example, cyclohexanol). Such gluing is well-suited to mass production. Furthermore, the current efficiency and fuel cell performance may be further increased by use of this method of manufacture. Besides the actual manufacture of electrodes, gluing is also suitable for the manufacture of a membrane electrode assembly, where electrodes prepared conventionally and/or in accordance with the method described here may be processed.

After applying an ion-conducting polymer layer to one surface of the substrate an electrocatalyst layer 23, obtained from a metal complex or salt dissolved in an electrolyte solution or a melt thereof is deposited on the electrodeposition electrode 10 by electrochemical deposition. Before inserting the electrodeposition electrode 10 into the deposition bath 6, preferably the surface of the substrate material 21 opposite the ion-conductive membrane 22 is covered so that during the subsequent electrodeposition substantially no catalyst material 23 is deposited on this surface. With regard to series production, cover 14 may be forgone through skillful bath guidance. For deposition it is important that the processes occur within a controllable physical range and the contact of the substrate materials is controlled.

For catalyst deposition, the electrodeposition electrode 10 is immersed in the electrolyte solution together with a counterelectrode 9, for example a platinized titanium sheet or expanded titanium metal, and connected to voltage source 1 by way of electrical paths 11 and 12. It would also be possible to attach expanded titanium metal counterelectrode to the walls and/or floors of the deposition equipment. In principle, however, other suitable counterelectrodes may also be used.

As membrane 22 is ion-conductive, electrocatalyst 23 may pass from the electrolyte solution through membrane 22 in ionic form. However, as membrane 22 is not conductive for electrons, catalyst material 23 is not deposited within the membrane. Thus, the catalyst material is deposited only when it reaches electrically conductive substrate material 21. This means that electrocatalyst 23 is deposited only in fringe region 20 between membrane 22 and substrate 21. This, however, is also exactly the region where catalyst material 23 is required during fuel cell operation.

Conventional utilization factors of electrocatalysts are about 3–20%. The utilization factors achieved with this method are believed to be greater than 50% to approaching 100%, but typically about 80%. The data was developed from the following values: using platinum as an example, the active surface area and roughness was determined by the charge in the hydrogen desorption range. The cluster sizes and distribution were determined from transmission electron microscope (TEM) and high resolution electron microscope (HREM) photographs. The surface-specific metal content (or loading, for example $\mu g$ of platinum per $cm^2$) was determined using inductively-coupled plasma emissions spectroscopy (ICP-OES).

Thus, a very high electrocatalyst utilization factor is achieved. It means, on the other hand, that an extremely low noble metal loading may be employed, which results in cost savings.

Further cost reduction is achieved, because the process described is suitable for mass production as the process is not only applicable for preparation of individual or discrete electrodes. Rather, in a continuous manufacturing process an ion-conductive membrane 22 may be applied to a substrate material 21 and, subsequently, the electrocatalyst 23 may, in an immersion bath, be introduced by electrochemical deposition. As both starting materials 21 and 22 are preferably flexible they may, for example, be applied to rollers in a reel-to-reel type process. Electrodeposition electrodes 10 may be manufactured continuously using this method and may subsequently be cut to size, punched or processed in a similar process, as required. A further substantial cost reduction results. Furthermore, clear time savings result in comparison with the known fuel cell electrode manufacturing processes, as complete steps in the process and sintering and drying phases may be forgone.

When building a complete membrane electrode assembly comprising two electrodes with an intermediate membrane, the electrodeposition electrodes 10 manufactured in such fashion may be used. Two separately manufactured electrodeposition electrodes may be symmetrically connected with one another, after electrodeposition. However, it is also possible to combine an electrodeposition electrode in any order with a conventional electrode or with a coated membrane to form a membrane electrode assembly.

EXAMPLES

In the following Examples 1–5, an ion-conductive membrane (approximately 10 $\mu m$ thick) was bonded to a flexible, carbonaceous substrate (approximately 75 $\mu m$ thick) by hot-pressing. In Examples 6 and 7, a powdery, acetylene black substrate layer and a flexible, carbon-containing fabric-like tissue (from Zoltek) were used, respectively. In Example 8, the ion-conductive membrane was glued to the substrate.

In Examples 1–4 and 8, 1.9 g/l $H_2PtCl_6 \cdot 6H_2O$ (40% Pt content) was dissolved in 0.1 molar $H_2SO_4$ saturated with argon while stirring with a magnetic stir bar. In Example 3, 3.4 g/l $RuCl_3$ was also added. In Examples 5–7, 5 g/l $H_2PtCl_6 \cdot 6H_2O$ was used. The overall electrolyte solution volume was 1.3 litres, respectively. In Examples 1–4 and 8, the electrolyte solution temperature during electrodeposition was 22° C.; in Example 5, 50° C.; and in Examples 6 and 7, 45° C., respectively. Higher temperatures may be beneficial in accelerating the electrodeposition process. The electrodeposition electrode to be coated on one side and a platinized titanium sheet as counterelectrode were immersed in the electrolyte solution. The substrate surface coated with the ion-conductive membrane faced the counterelectrode. The back side of the electrode to be coated was covered with a polytetrafluoroethylene or polyethylene cover. The electrode surface to be coated was approximately 7 cm×8 cm (although larger electrodes, for example 25 cm×25 cm, may be prepared). The current flowing during deposition was recorded and integrated over the deposition period in order to determine the charge that had flowed. The resulting electrodes were briefly rinsed with deionized water and further processed into membrane electrode assemblies.

Example 1

Figure 3A:
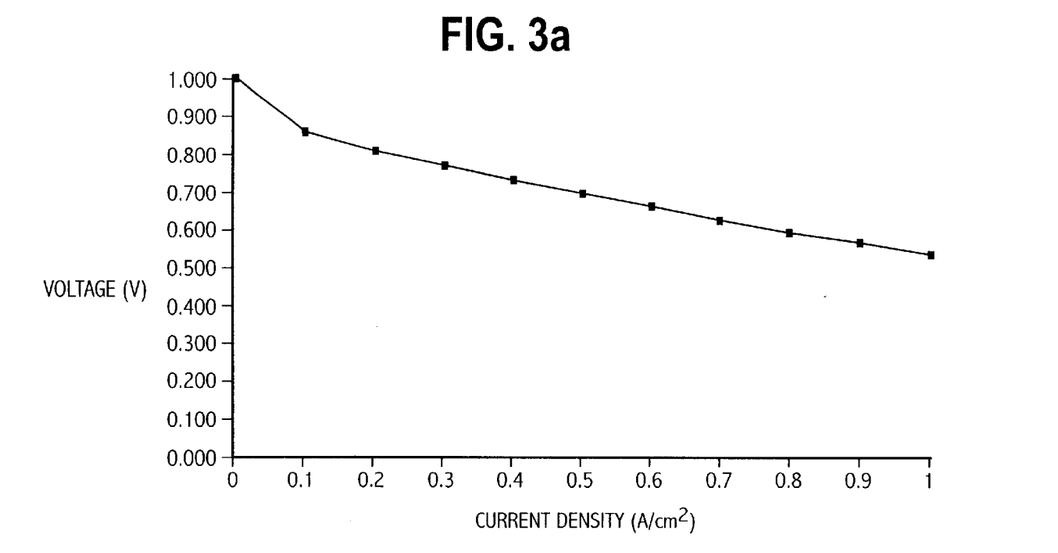
FIGS. 3a–h are plots of cell voltage as a function of current density (expressed in milliamperes per square centimeter) in electrochemical fuel cells employing electrodes (of area 49 $cm^2$) manufactured as described herein.

A continuous, sinusoidal voltage pulse with a frequency of 5 Hz was applied across the electrodes with a function generator. After a total charge passage of 68 C deposition was terminated. According to atom emission spectroscopic analysis, the platinum loading of an electrode manufactured in such manner was 7.3 $\mu g/cm^2$. The electrode manufactured in such manner was used as the anode in a membrane electrode assembly. A standard electrode with a platinum coating of 4 $mg/cm^2$ was used on the cathode side. Afterwards, the current/voltage curve illustrated in FIG. 3a was recorded in a test cell.

Example 2

Figure 3B:
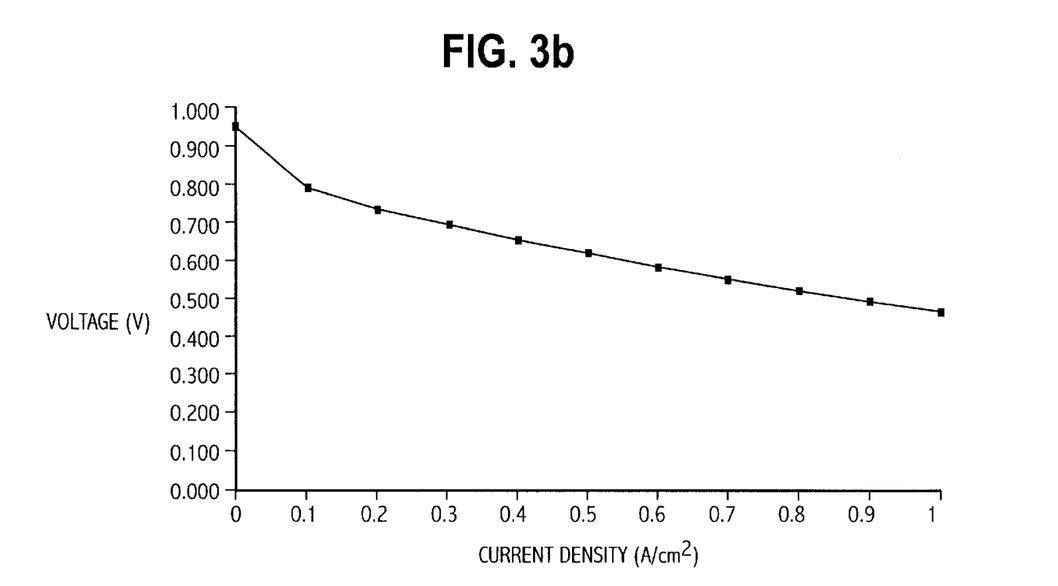

In contrast to Example 1, a continuous, triangular (sawtooth) voltage pulse with a frequency of 5 Hz was applied across the electrodes with a function generator. Total charge passage was 600 C and the resultant platinum loading was approximately 100 $\mu g/cm^2$. The electrode manufactured in such manner was further used as the cathode in a membrane electrode assembly. A platinum coating of 4 mg/cm$^2$ was used on the anode side. Afterwards, the current/voltage curve illustrated in FIG. 3b was recorded in a test cell.

Example 3

Figure 3C:
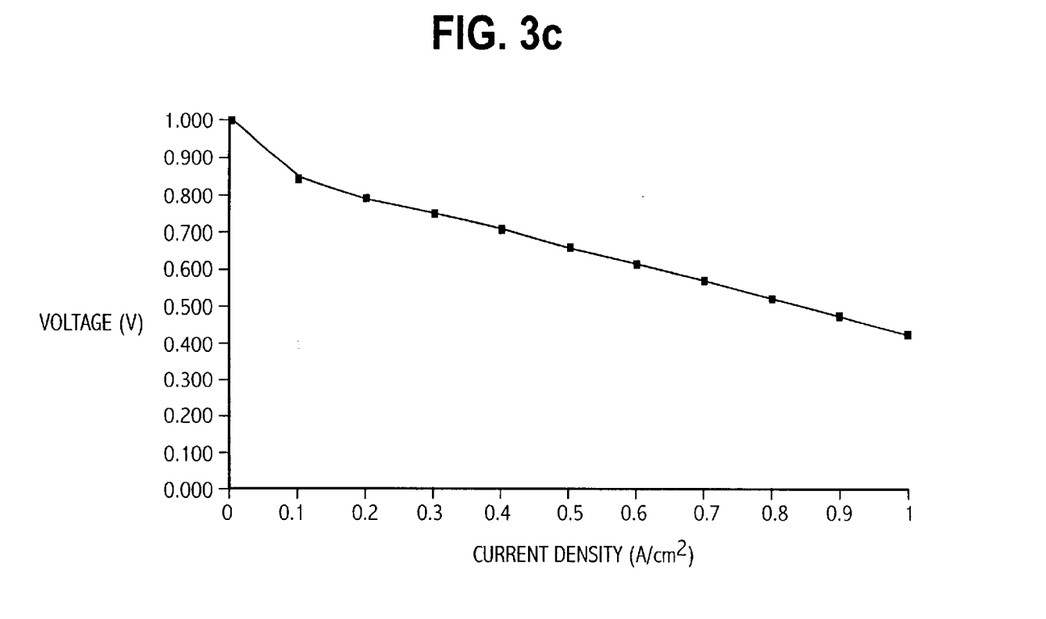

A continuous, triangular (saw-tooth) voltage pulse with a frequency of 5 Hz was applied across the electrodes with a function generator. Total charge passage was 200 C. The resultant platinum loading was approximately 5 µg/cm$^2$ and the ruthenium loading approximately 10 µg/cm$^2$. The electrode manufactured in such manner was used as the anode in a membrane electrode assembly. A platinum coating of 4 mg/cm$^2$ was used on the cathode side. Afterwards, the current/voltage curve illustrated in FIG. 3c was recorded in a test cell.

Example 4

Figure 3D:
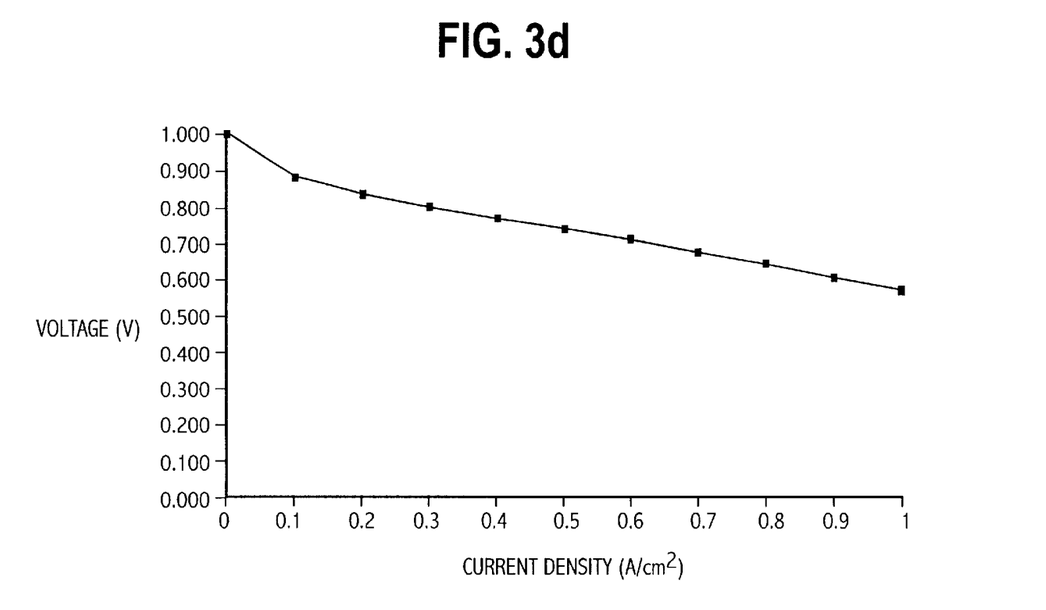

In this example, a continuous, sinusoidal voltage pulse with a frequency of 10 Hz was applied across the electrodes with a function generator. Total charge passage was 136 C. The resultant platinum loading was approximately 10 µg/cm$^2$. The electrode manufactured in such manner was used as the anode in a membrane electrode assembly. A standard electrode with a platinum coating of 4 mg/cm$^2$ was used on the cathode side. Afterwards, the current/voltage curve illustrated in FIG. 3d was recorded in a test cell.

Example 5

Figure 3E:
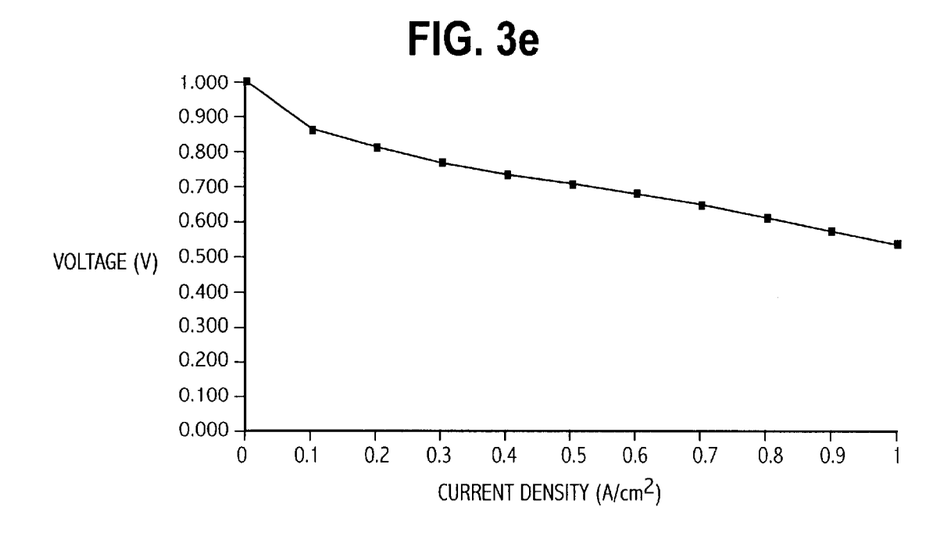

A continuous, sinusoidal voltage pulse with a frequency of 5 Hz was applied across the electrodes with a function generator. Total charge passage was 18 C. The electrode manufactured in such manner was used as the anode in a membrane electrode assembly. A platinum coating of 4 mg/cm$^2$ was processed on the cathode side. Afterwards, the current/voltage curve illustrated in FIG. 3e was recorded in a test cell.

Example 6

Figure 3F:
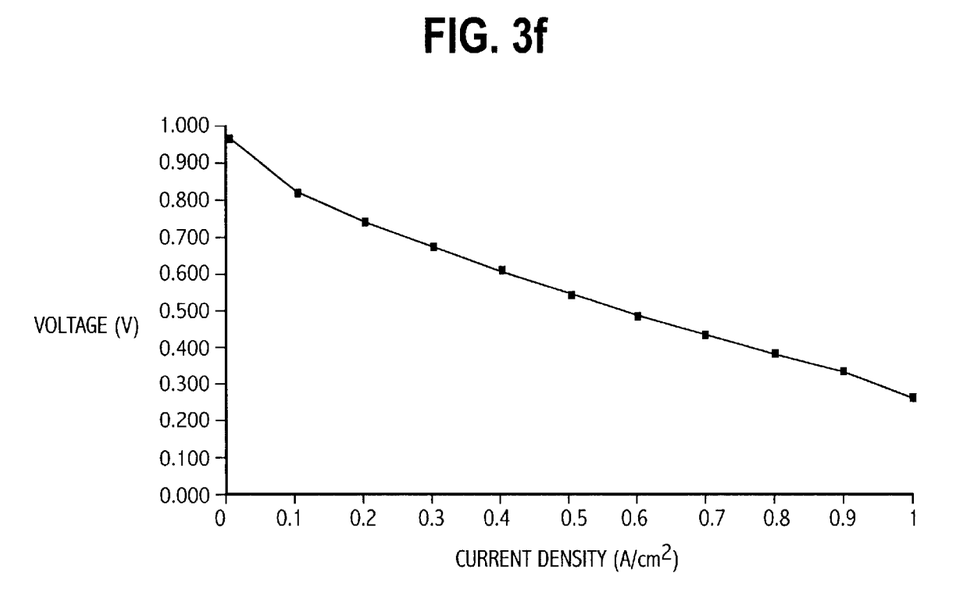

A continuous, sinusoidal voltage pulse with a frequency of 25 Hz was applied across the electrodes with a function generator. The electrode manufactured in such manner was used as the cathode in a membrane electrode assembly. A standard electrode with a platinum coating of 4 mg/cm$^2$ was used on the anode side. Afterwards, the current/voltage curve illustrated in FIG. 3f was recorded in a test cell.

Example 7

Figure 3G:
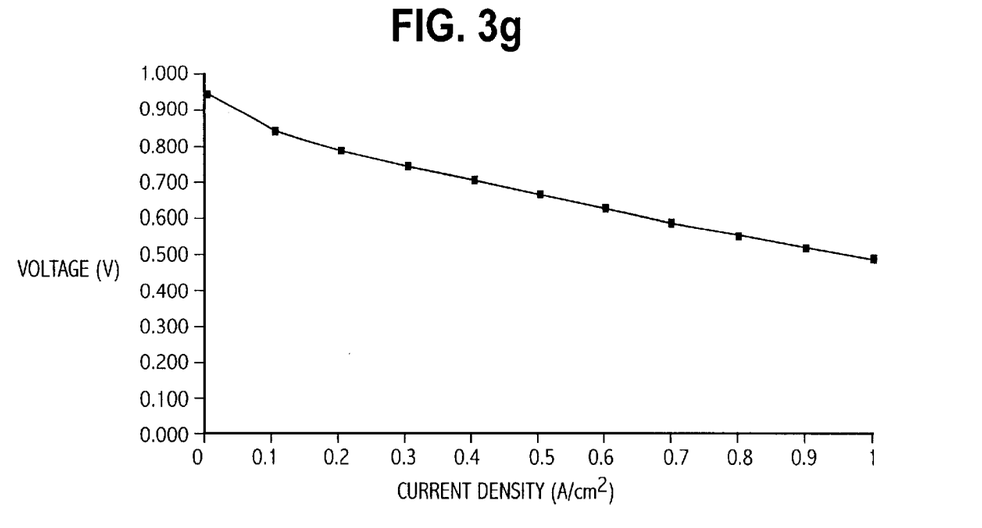

A continuous, sinusoidal voltage pulse with a frequency of 100 Hz was applied across the electrodes with a function generator. The electrode manufactured in such manner was used as the cathode in a membrane electrode assembly. A platinum coating of 4 mg/cm$^2$ was processed on the anode side. Afterwards, the current/voltage curve illustrated in FIG. 3g was recorded in a test cell.

Example 8

Figure 3H:
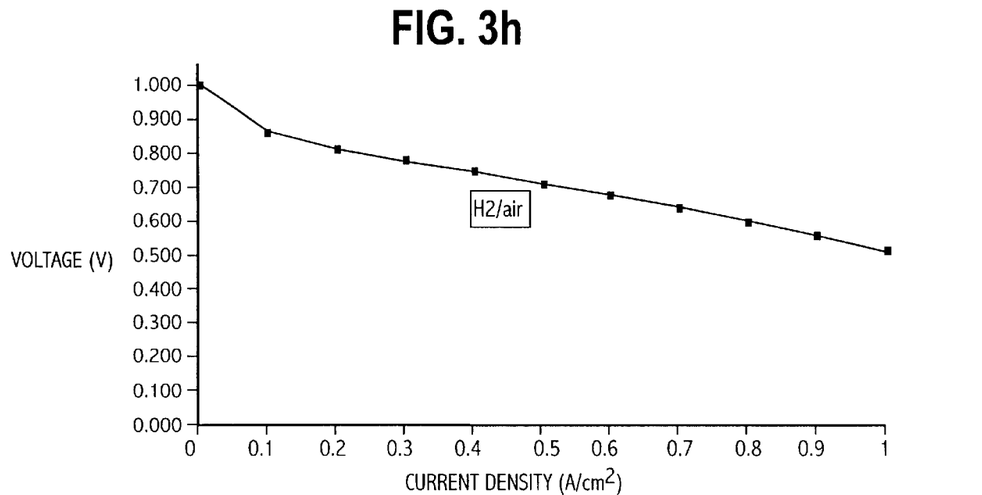

A continuous, sinusoidal voltage pulse with a frequency of 5 Hz was applied across the electrodes by the function generator. The electrode manufactured in such manner was used as the anode in a membrane electrode assembly. A standard electrode with a platinum coating of 4 mg/cm$^2$ was processed on the cathode side. Afterwards, the current/voltage curve illustrated in FIG. 3h was recorded in a test cell.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for the preparation of a membrane-electrode assembly, said method comprising depositing an electrocatalyst by electrochemical deposition on a porous, electrically conductive substrate, said substrate having an ion-conducting polymer film on at least one face thereof, wherein said electrochemical deposition method comprises applying a controlled pulsed voltage between a counterelectrode and a working electrode comprising said substrate during said electrochemical deposition.

2. The method of claim 1 wherein the pulse frequency of said pulsed voltage is less than about 100 kHz.

3. The method of claim 2 wherein the pulse frequency of said controlled pulsed voltage is less than or equal to about 100 Hz.

4. The method of claim 1 wherein said electrocatalyst is electrodeposited from an aqueous electrolyte solution.

5. The method of claim 4 wherein said aqueous electrolyte solution comprises an anionic metal salt of said electrocatalyst.

6. The method of claim 5 wherein said electrocatalyst is platinum and said aqueous electrolyte solution comprises $H_2PtCl_6$.

7. The method of claim 6 wherein said eletrocatalyst comprises platinum and ruthenium, and said aqueous electrolyte solution further comprises $RuCl_3$.

8. The method of claim 4 wherein said aqueous electrolyte solution has a metal content in the range of about 2 mg/l to about 150 g/l.

9. The method of claim 4 wherein said aqueous electrolyte solution comprises a solution of a mineral acid having a molarity of about 0.1–5.0 molar.

10. The method of claim 4 wherein said mineral acid is selected from the group consisting of $H_2SO_4$, HCl, $HClO_4$, or $H_3PO_4$.

11. The method of claim 1 wherein said polymer film comprises a preformed membrane bonded to said substrate.

12. The method of claim 1 wherein said polymer film comprises a preformed membrane bonded to said substrate using a method selected from the group consisting of hot laminating, hot pressing, gluing and rolling.

13. The method of claim 1 wherein said ion-conducting polymer is a proton conducting polymer.

14. The method of claim 13 wherein said proton conducting polymer is a perfluorosulfonic acid with an equivalent weight less than 1000.

15. The method of claim 1 wherein said polymer film is applied to said substrate as a solution.

16. The method of claim 15 wherein said solution of said polymer is applied to said substrate by a method selected from the group consisting of dipping, screen printing, tape casting, brushing, plasma deposition, vapour deposition and spraying.

17. The method of claim 1 wherein said substrate is a flexible, porous electrically conductive sheet material.

18. The method of claim 1 wherein said substrate is selected from the group consisting of carbon fiber paper, woven carbon cloth, carbon fiber nonwoven, carbon felt, and carbon tissue.

19. The method of claim 1 wherein said substrate is a composite material comprising a preformed web and an electrically conductive particulate fill.

20. The method of claim 1 wherein said electrocatalyst is electrodeposited from a melt.

21. The method of claim 1 wherein said controlled pulsed voltage is a continuous sinusoidal or triangular pulse.

22. The method of claim 1 wherein the amount of electrocatalyst deposited on said substrate is less than or equal to about 100 $\mu$g/cm$^2$.

23. The method of claim 22 wherein the amount of electrocatalyst deposited on said substrate is less than or equal to about 10 $\mu$g/cm$^2$.

* * * * *